Feb. 21, 1950     D. M. KIMBLE     2,497,997
PURIFICATION OF ALCOHOLS
Filed March 4, 1946
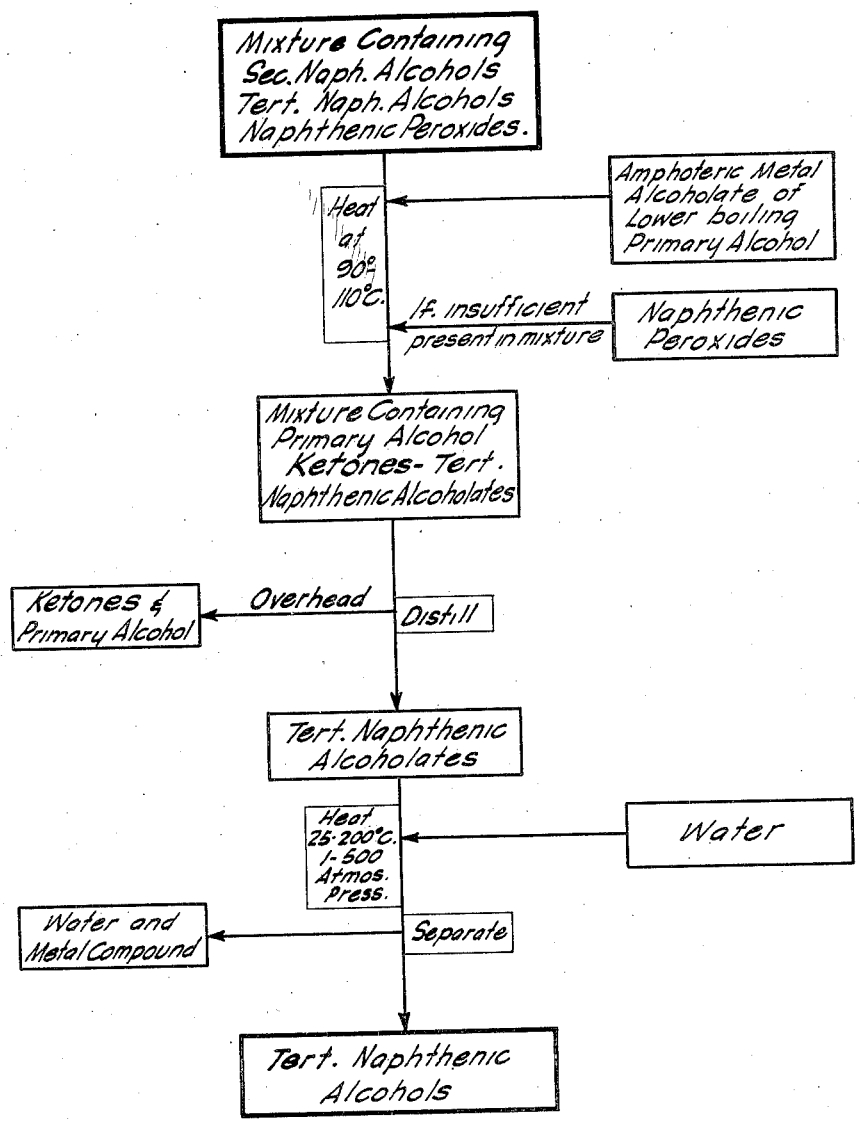
INVENTOR.
DWIGHT M. KIMBLE,
BY Ross J. Garofalo
ATTORNEY.

Patented Feb. 21, 1950

2,497,997

UNITED STATES PATENT OFFICE 2,497,997

PURIFICATION OF ALCOHOLS

Dwight M. Kimble, Los Angeles, Calif., assignor to Union Oil Company of California, Los Angeles, Calif., a corporation of California Application March 4, 1946, Serial No. 651,986

6 Claims. (Cl. 260—617)

The invention relates to the treatment of complex mixtures of organic compounds containing therein a tertiary alcohol and particularly a tertiary naphthenic alcohol. More especially the invention relates to the separation of such tertiary naphthenic alcohols, either as an alcohol rich fraction or as useful derivatives thereof.

Such processes in organic syntheis as oxidation, reduction, dehydrogenation, dehydration and ether formation are well known and from such processes there are obtained complex mixtures, the purification of which is contemplated in the present invention. More specifically the invention provides means for purifying the products from the oxidation of naphthenic hydrocarbons, from the reduction of high boiling ketones and particularly high boiling naphthenic ketones, from the oxidation or dehydrogenation of high boiling naphthenic alcohols and from the partial dehydration of glycols which last named process results in the formation of monohydric alcohols and cyclic ethers of similar boiling points. Thus, I contemplate the treatment of mixtures of secondary and tertiary naphthenic alcohols, secondary and tertiary naphthenic alcohols containing ketones, secondary and tertiary naphthenic alcohols containing ketones and ethers including the epoxides, secondary and tertiary naphthenic alcohols containing ketones and hydroperoxides, secondary and tertiary naphthenic alcohols containing hydroperoxides and ethers, secondary and tertiary naphthenic alcohols containing ketones, hydroperoxides and ethers, and the like. The presence of a secondary alcohol in these mixtures is in most cases the normal result of the processes from which these mixtures originate, but the invention is equally applicable to the separation of mixtures of the above types in which secondary alcohols are not present.

All of the above mentioned processes and particularly that of the oxidation of naphthenic hydrocarbons are faced with a number of chemical resolution problems. Each resolution has in the past involved a costly process including such operations as steam distillation, precipitation, filtration, precise fractionation, or the like. These processes present many operational difficulties as a result of the closeness of the boiling points of the various components within the complex mixture to be resolved, the tendency of certain of the compounds contained therein to decompose at the necessary temperatures of processing and the effects of hydrogen bonding or azeotrope formation between various components of the mixture. This latter effect is particularly apparent in the resolution of the mixture resulting from the oxidation of naphthenic hydrocarbons. Such a mixture will include hydroperoxides, secondary and tertiary naphthenic alcohols, ethers and ketones, predominantly naphthenic in character, and I have found this mixture difficult to separate by fractionation even at reduced pressures as a result of the disturbance of the normal vapor pressure equilibrium of these compounds by azeotrope formation, hydrogen bonding or some other mechanism difficult to ascertain.

It is therefore a primary object of the present invention to separate secondary and tertiary naphthenic alcohols from ketones of similar boiling point and particularly from naphthenic ketones.

It is another object of my invention to provide a process for the separation of secondary and tertiary naphthenic alcohols of similar boiling points from each other.

Yet another object of the present invention is a provision of a process for the concentration of a peroxide-containing mixture resulting from the oxidation of naphthenic hydrocarbons by the removal therefrom of the secondary and tertiary naphthenic alcohols formed in the process.

Correlatively, and as a modification of the process employed to accomplish the above objects, the present invention further contemplates the preparation of the naphthyl esters of the amphoteric metals including particularly boron, aluminum, arsenic and tin.

It is also an object of the present invention to effect the resolution of the above-described mixtures in such a manner that organic esters of tertiary naphthenic alcohols having useful plasticizing characteristics will be formed.

Other objects and advantages of the present invention will become apparent to those skilled in the art as the description thereof proceeds.

The processes and modifications of my invention as claimed herein are illustrated in the accompanying drawing, which is in the form of a flow diagram.

According to the present invention the above contemplated objects are accomplished by a process which involves the alcoholysis of the secondary and tertiary naphthenic alcohols contained in the complex mixtures hereinbefore discussed followed by distillation of the resultant mixture to yield two fractions; one rich in the ketones, peroxides, and materials boiling below the esters formed in the alcoholysis reaction, and the other rich in these esters. Alternative procedures may be followed in the treatment of the ester-containing fraction resulting from this distillation, but in its simplest elements the process comprises hydrolysis thereof followed by subsequent distillation to yield a fraction predominantly alcoholic in nature and a residue comprising high boiling components, polymers, and the like.

If it is desired to further treat the product resulting from the oxidation of naphthenic hydrocarbons several alternative procedures may be employed. Thus the alcohols, being secondary and tertiary naphthenic alcohols, may be separated from the peroxide-containing mixture by alcoholysis as above described leaving the peroxide contaminated only by the ketones contained in the original mixture. In this regard, I have found that in a crude oxidation product from which the unreacted hydrocarbons have been removed there is approximately twice the concentration of mixed secondary and tertiary naphthenic alcohols than of the ketones. Thus, in a typical concentrate there will be approximately 60% of naphthenic hydroperoxide, 25% to 30% of secondary and tertiary alcohol, and 10% to 15% of ketones predominantly naphthenic in character. Therefore, by the removal of the alcohols from this mixture by the process of my invention the peroxide content may be increased from approximately 60% to from 80% to 85%. Alternatively, by the method hereinafter described the peroxides may be decomposed in the process of alcoholysis to yield additional naphthenic alcohols. This modification will be particularly desirable when the alcohols constitute the primary product sought.

The alcoholysis step of the process is carried out at temperatures ranging from about 80° C. to about 150° C. and at pressures in the range of about 10 mm. to about atmospheric in the presence of an organic ester or a metal alcoholate of an alcohol boiling below the alcohols to be separated from the crude mixture. In this respect I prefer to employ, to accomplish the ester exchange reaction, the esters of the amphoteric metals and particularly boron and aluminum with low boiling primary aliphatic alcohols such as ethyl aluminate, propyl borate, butyl borate, butyl aluminate, and the like. Many of the metal naphthylates formed in the alcoholysis reaction are valuable as such, without subsequent hydrolysis, as intermediates for organic synthesis, and it is within the contemplation of my invention to isolate these naphthylates for this purpose.

Because of the ready availability of aluminum it may find wider usage than the boron in the formation of the lower boiling esters necessary to the alcoholysis reaction. In addition to this advantage we have found that in many instances the formation and usage of the lower boiling alcoholates is unnecessary for aluminum metal may be used as such to esterify the secondary and tertiary naphthenic alcohols without the necessity of going through the ester exchange reaction. Thus, aluminum powder or shavings may be added directly to the complex mixture containing either secondary or tertiary naphthenic alcohols or both, and by maintaining the mixture at a temperature of 80° C. or higher at reduced or atmospheric pressures the aluminum alcoholates of the secondary and tertiary alcohols may be formed. In this manner the tertiary alcohols may be reacted with aluminum in one of two ways, viz.; (1) in the presence of the aluminum alcoholate of a low boiling alcohol; or (2) in the presence of aluminum metal and a primary alcohol that does not interfere with the boiling point separability of the mixture.

The alcoholysis step of the process may be employed to accomplish divers ends. Thus the difference in the rate of esterification or ester exchange exhibited by secondary and tertiary naphthenic alcohols may be utilized to selectively esterify secondary alcohols preferentially to the tertiary alcohols thus providing means of separating these alcohols from a mixture containing both. Alternatively the alcoholysis may be carried substantially to completion whereby both the secondary and tertiary naphthenic alcoholates are formed in which case these alcoholates may be separated from other organic components in the mixture such as naphthenic ketones, naphthenic hydroperoxides, alicyclic ketones, ethers, and the like. Subsequently, as hereinafter more fully disclosed, it may be desirable to hydrolyze the separated alcoholates to reform the corresponding alcohols and effect the separation of these by the above differential alcoholysis. It is significant that the alcoholysis or esterification reaction should be carried out either with a low boiling metal alcoholate or a metal but not in the presence of the corresponding acid, for if the acid were to be employed directly, dehydration of these alcohols would result rather than the desired alcoholization.

In another alternative method of procedure the ester exchange may be carried out at conditions of sufficient severity to effect the decomposition of any naphthene peroxide in the mixture. Classical methods of hydrogenation of such peroxide containing mixtures in the presence of a catalyst or reduction with ferrous sulphate or similar materials cause a large part of the peroxide to be decomposed to lower molecular weight products. I have found that by carrying out the ester exchange reaction of my invention at conditions adapted to decompose these peroxides that the primary products of decomposition are the corresponding alcohols which in the case of naphthenic peroxides or hydroperoxides will be naphthenic alcohols. This method of procedure results in a distinct advantage over those of the prior art inasmuch as the alcohols, which are more desirable compounds, are formed, and these alcohols being predominantly secondary and tertiary naphthenic alcohols may be separated from other organic compounds in the mixture together with the secondary and tertiary naphthenic alcohols originally present therein. Thus, by carrying out the process at temperatures between about 90° C. to 110° C. the peroxide will be decomposed to the corresponding alcohol, whereas at temperatures from 80° C. to 100° C. the ester exchange may be accomplished without appreciable decomposition thereof. The apparent overlapping of these temperature ranges is due to the difference in conditions necessary or permissible dependent upon the concentration of peroxide in the mixture. Thus, the lower the concentration of peroxide the higher the temperature necessary to effect the decomposition thereof or correlatively the higher the permissible temperature without decomposition. Which view is taken is dependent upon the end products sought. Obviously the converse situation also exists.

Following the alcoholysis step of the process, regardless of the method of accomplishment thereof, the reaction mixture is flash distilled to remove lower boiling organic components from the naphthenic alcoholate. For example, if the original mixture comprises the products from the oxidation of a naphthenic hydrocarbon and the alcoholysis is carried out under conditions adapted to prevent the decomposition of the peroxide there will be separated from the naphthenic alcoholates in this flash distillation the ketones and peroxides present in the mixture together with lower boiling impurities. On the other hand, if the alcoholysis is carried out under conditions adapted to decompose the naphthenic peroxide to naphthenic alcohols which are subsequently esterified, the primary component to be separated therefrom will be the ketones present in the original mixture.

Turning now to the residue from the above distillation, which comprises essentially the alcoholates of naphathenic alcohols and in some cases residual higher boiling organic compounds, several alternative procedures may be followed. In the simplest of these, the alcoholates may be hydrolyzed to reform the corresponding secondary and tertiary naphthenic alcohols which thereupon may be separated from any residual material by distillation. The hydrolysis of these alcoholates may be readily accomplished with water to form the alcohols or alternatively other water-like materials may be employed to form other compounds. Such alternative hydrolyzing agents for example may include ammonia, liquid hydrogen cyanide, phosphine, and the like, and the alkyl analogs of such compounds. Products from the hydrolysis will in any case result in the formation of the metal-containing acid, the metal oxide, or organic acid, depending upon the composition of the alcoholates and not upon the hydrolyzing agent. On the other hand, different compounds will be formed with the naphthenic portion of the alcoholates dependent upon the hydrolyzing agent employed. Water, of course, will result in the formation of the corresponding naphthenic alcohols, ammonia in the formation of corresponding amines, hydrogen cyanide in the formation of corresponding nitriles, phosphine in phosphides, and so on.

The hydrolysis of the alcholates is accomplished by treatment of the alcoholate concentrate, resulting from the distillation of the products of alcoholysis, with the desired hydrolyzing agent which may be any of the above-described compounds or similar compounds at temperatures in the range of about 25° C. to about 200° C. and at pressures in the range of about 1 to about 500 atmospheres. The products from the hydrolysis may be distilled from the unreacted material to give substantially pure compounds or fractions of similar compounds. Thus if the alcoholates to be hydrolyzed consist of a mixture of secondary and tertiary naphthenic alcoholates, the products of hydrolysis with water will comprise the corresponding naphthenic alcohols and I have found that by the distillation of this hydrolysis product an alcohol fraction of a purity of 95% or more may be obtained. In such a case this alcohol product will comprise a mixture of secondary and tertiary naphthenic alcohols. In this regard the relative proportions of these two types of alcohols in the fraction will be dependent upon the method of alcoholysis employed. Thus, if the ester exchange is carried out so as to prevent the decomposition of the naphthenic peroxides the normal ratio of secondary alcohol to tertiary alcohol is in the range of about 1 to about 3 or 4. However, if the alcoholysis is carried out under conditions adapted to promote the decomposition of the naphthenic peroxide to naphthenic alcohols the ratio of secondary naphthenic alcohols to tertiary naphthenic alcohols will be in the range of about 1 to 15. In either case the alcohol fraction obtained may be treated in an identical manner as above described to effect the separation of the secondary from the tertiary naphthenic alcohols; i. e., by selective alcoholization of the more rapidly esterified secondary alcohol.

Alternative procedures may be followed in the treatment of the alcoholate fraction obtained from the flash distillation of the products of the alcoholysis step. In one alternative the naphthenic alcoholates may be advisedly used, as such, as intermediates for organic synthesis in which case the process is terminated at this point eliminating the necessity of hydrolysis, etc.

In another method of operation the products of alcoholysis may be treated prior to distillation with an oxidizing agent such as ferric sulfate, cupric sulfate, or the tertiary hydroperoxide itself, which may be contained in the original mixture in the event that such mixture was derived from the oxidation of naphthenic hydrocarbon. In this treatment the ketones present will remain as such and in addition any secondary alcoholates, derived from the secondary alcohol which probably arose in the first instance from the reduction of the ketones, will be converted to ketones. By proportioning the oxidizing agent, such as the peroxide, against the secondary alcohols present the end products will comprise pure tertiary alcoholates and ketones which may then be separated by flash distillation to remove the lower boiling ketones, and the pure tertiary alcoholates may be hydrolyzed or employed as such as hereinbefore described. In order to catalyze or increase the rate of the above oxidation reaction it may be desirable to add small amounts or even molar amounts of an aluminum alcoholate of a low boiling alcohol.

It is also possible to use a high boiling ketone as the oxidizing agent in the above modified procedure. As a result this high boiling ketone would be reduced to an alcohol simultaneously with the oxidation of the secondary alcohols to the ketone.

Where the tertiary peroxide is to be used as the oxidizing agent the secondary alcohols present in the mixture as well as any primary alcohols, which might be in certain mixtures to be treated, will be oxidized to the corresponding acid or aldehyde and ketone depending upon the conditions of oxidation employed and the thus produced carbonyl compounds will be freed from the metal complexes normally resulting from the oxidation of the alcoholates by the teritary alcohol produced from the correlative reduction of the peroxide. These carbonyl compounds would then be distillable from the reaction mixture as above indicated. This process provides a means to convert 1,3 and 1,4-glycol to the diketones which find usage in the production of barbiturates.

The process of my invention also provides means for preparing the organic esters of the tertiary naphthenic alcohols which have heretofore been difficult to prepare due to the ease with which these alcohols dehydrate. I have found that these esters can be readily formed by the treatment of the metal alcoholate with an organic acid, organic ester, or acetic anhydride. Thus the naphthyl borates or aluminates formed in the alcoholysis of the tertiary naphthenic alcohols may be treated with acetic anhydride to produce the acetate esters of these tertiary naphthenic alcohols. In such a process it was observed that substantially no olefins were formed. In this reaction, assuming the alcoholate to be treated to be a naphthyl borate, the boron would be obtained either acetylated as the triacetyl boron or as boron trioxide dependent upon the stoichiometric proportions of the reactants employed. In addition, for the acids of higher molecular weight, the acetyl chlorides are suitable acetylating agents in which case a gaseous product would be formed such as boron trichloride. The formation of such a gaseous product would have the effect of minimizing any purification difficulties by virtue of the ease of removal of such gaseous product from the reaction mixture. These organic esters of the tertiary naphthenic alcohols are valuable as plasticizers, and also in some cases as fungicides and insecticides.

Broadly, therefore, the process of my invention contemplates and provides means for the resolution of complex fractions of organic compounds containing secondary and tertiary naphthenic alcohols or simply tertiary alcohols together with such compounds as the peroxides, hydroperoxides, ketones, of either naphthenic or paraffinic character, ethers, and the like. The resolution is accomplished primarily by the alcoholysis of this mixture either with a lower boiling alcohol ester of an amphoteric metal and particularly with aluminum or borate ester of the lower boiling alcohols or with aluminum metal itself, whereby the alcoholates formed may be separated as such from any ketones, peroxides or other compounds remaining in the mixture, which barring decomposition thereof to alcohols will be unaffected by the alcoholysis. In this regard, methods of alcoholysis have been disclosed which permit the decomposition of naphthenic peroxides, contained in many such mixtures, to corresponding secondary or tertiary naphthenic alcohols; i. e., the alcoholysis may be accomplished to produce either the peroxide as such or alcoholates derived from the alcohols resulting from the decomposition of these peroxides. The alcoholates separated from the other organic compounds in the mixture may be used as such as chemical intermediates, may be hydrolyzed to the corresponding alcohols, may be hydrolyzed with compounds other than water to form nitriles, amines, or the like, or may be treated with suitable oxidizing agents to separate the secondary from the tertiary alcoholates by the mechanism of oxidation of the secondary alcohols, in any of which alternative procedures the resultant products may be obtained in substantially pure form by simple distillation. Thus the invention as herein described and claimed comprises any and all of these primary procedural methods together with the modifications thereof herein disclosed.

Having described my invention and realizing that many modifications thereof will occur to those skilled in the art without departing from the contemplated objects or the described methods of my invention, I claim:

1. A process for the purification of a mixture of secondary and tertiary naphthenic alcohols, naphthenic peroxide and ketones to recover tertiary naphthenic alcohols therefrom which comprises contacting said mixture at a temperature between about 90° C. and 110° C. with an alcoholate of an amphoteric metal and a primary alcohol, said primary alcohol having a boiling point below that of the alcohols contained in said complex mixture, whereby said secondary and tertiary naphthenic alcohols are converted to the corresponding naphthenic alcoholates, the secondary alcoholates are oxidized to the corresponding ketones by reaction with said naphthenic peroxide and said naphthenic peroxide is reduced to the corresponding naphthenic alcohol, which last named alcohol is converted to the corresponding amphoteric metal naphthenic alcoholate by reaction with said primary alcoholate, separating the resulting tertiary naphthenic alcoholates from the reaction mixture and hydrolyzing said separated tertiary naphthenic alcoholates to form the corresponding tertiary naphthenic alcohols.

2. A process according to claim 1 in which the metal is aluminum.

3. A process according to claim 1 in which the metal is boron.

4. A process according to claim 1 in which additional naphthenic peroxides are added following the contacting of the complex mixture with an alcoholate of an amphoteric metal and secondary alcohol in an amount sufficient to completely oxidize the secondary naphthenic alcolates present.

5. A process for recovering tertiary naphthenic alcohols from a complex mixture containing secondary and tertiary naphthenic alcohols, ketones and tertiary naphthenic hydroperoxides which comprises contacting said complex mixture at a temerature between 90° C. and 110° C. with an alcoholate of an amphoteric metal and a primary alcohol, said primary alcohol having a boiling point below that of the secondary and tertiary naphthenic alcohols, which contacting operation converts said secondary and tertiary alcohols into the corresponding amphoteric metal naphthenic alcolates, the secondary naphthenic alcoholates being oxidized by the naphthenic hydroperoxides present in said mixture thereby converting the secondary naphthenic alcoholates to ketones and converting said naphthenic hydroperoxides to tertiary naphthenic alcohols, which last named alcohols are converted to the corresponding amphoteric metal naphthenic alcoholates by the primary alcoholates, distilling the resulting reaction mixture to vaporize ketones and primary alcohol thereby leaving tertiary naphthenic alcoholates as a distillation residue.

6. A process according to claim 5 in which additional naphthenic peroxides are added following the contacting of the complex mixture with an alcoholate of an amphoteric metal and secondary alcohol in an amount sufficient to completely oxidize the secondary naphthenic alcoholates.

DWIGHT M. KIMBLE.

REFERENCES CITED

The following references are of record in the file of this patent:

UNITED STATES PATENTS

| Number | Name | Date |
|---|---|---|
| 1,433,308 | Steffens | Oct. 24, 1922 |
| 2,072,806 | Wood | Mar. 2, 1937 |
| 2,258,713 | Rothrock | Oct. 14, 1941 |
| 2,276,094 | Rothrock | Mar. 10, 1942 |